United States Patent [19]
Suzuki et al.

[11] Patent Number: 5,178,816
[45] Date of Patent: Jan. 12, 1993

[54] METHOD OF MOLDING HEAT-RESISTANT VESSEL HAVING THICK PORTION ON BODY

[75] Inventors: Saburo Suzuki; Hiroyuki Orimoto, both of Ueda; Fumiya Amari, Komoro, all of Japan

[73] Assignee: Nissei ASB Machine Co., Ltd., Nagano, Japan

[21] Appl. No.: 780,352

[22] Filed: Oct. 22, 1991

[30] Foreign Application Priority Data

Oct. 25, 1990 [JP] Japan ................... 2-289649

[51] Int. Cl.$^5$ ............ B29C 49/06; B29C 49/12; B29C 49/18
[52] U.S. Cl. ................ 264/530; 264/342 R; 264/521; 264/532
[58] Field of Search ............ 264/529, 530, 532, 230, 264/235, 342 R, 346, 520, 521

[56] References Cited

U.S. PATENT DOCUMENTS

| | | | |
|---|---|---|---|
| 3,956,441 | 5/1976 | Uhlig | 264/530 |
| 3,989,784 | 11/1976 | Uhlig | 264/530 |
| 4,550,007 | 10/1985 | Ohtsu et al. | 264/530 |
| 4,836,971 | 6/1989 | Denis et al. | 264/530 |

Primary Examiner—Jan H. Silbaugh
Assistant Examiner—Catherine Timm
Attorney, Agent, or Firm—Oliff & Berridge

[57] ABSTRACT

A method of manufacturing a heat resistant plastic vessel including: injection molding a preform; primary stretch blow molding the preform to obtain a primary blow-mold object; heat-shrinking the primary blow-mold object; and secondary stretch blow molding the heat-shrunk object to obtain a secondary blow-mold object as a heat-resistant plastic vessel. In the primary stretch blow molding process, a concavity is formed on a body of the primary blow-mold object. The concavity has a thickness larger than the other body portion. In the heat-shrunk object, the large thickness portion has a lower heat retaining capacity than the other body portion. The heat-shrunk object then undergoes the secondary stretch blow molding process, thereby obtaining the secondary blow-mold object, which has a large thickness portion corresponding to the concavity of the primary blow-mold object to assure high mechanical strength such as buckling strength of the final product.

7 Claims, 5 Drawing Sheets

METHOD OF MOLDING HEAT-RESISTANT VESSEL HAVING THICK PORTION ON BODY

BACKGROUND OF THE INVENTION

1. Field of the Invention

This invention relates to a method of manufacturing a heat-resistant plastic vessel through processes of making a preform, a primary blow-mold object and a secondary blow-mold object, and to a primary blow-mold object made by this method.

2. Description of the Related Art

One method of fabricating a heat-resistant plastic vessel is known in U. S. Pat. No. 4,836,971. With this method, firstly an injection-molded preform is subject to the biaxial stretch blow molding process to obtain a primary blow-mold object, which is vertically longer than a heat-resistant hollow plastic object as a final product. Then, this primary blow-mold object is heat-shrunk, being subject to the biaxial stretch blow molding process to obtain the heat-resistant hollow object as the final product.

The secondary blow-mold object, i.e. a heat-resistant vessel such as a bottle, has to meet a variety of requirements. One of them is that the heat-resistant hollow object should have a buckling strength enough to prevent its deformation and breakage caused by an axial compressive force.

To increase the buckling strength, the hollow object usually has a ring-shaped concave or convex reinforcing rib on its body. Such reinforcing rib can be easily formed by making a concave or convex portion on the inner surface of secondary blow cavity molds.

According to studies of researchers including the present inventors, it has been confirmed that a large thickness portion around the body of the hollow object is very effective to assure the buckling strength. Such large thickness portion may be positioned either at the reinforcing rib or at any position on the body regardless of the reinforcing rib.

It is however very difficult to form a large thickness portion around the body of the primary blow-mold object. It is theoretically feasible to heat the primary blow-mold object by applying different temperatures thereto so that the portions of the object may be differently heated, and that the hot portion is stretched to be thinner than the cold portion which is less stretched. The present inventors performed experiments, finding that the large thickness portion is formed according to the foregoing theory, but that it is much more difficult to control a region to be thickened to obtain a large thickness portion in the final product. In other words, a very large region was thickened even if temperatures applied to heat the primary blow-mold object were controlled very carefully. Specifically, the large thickness portion is formed not only at the target area but also at areas around the target area, or the desired thickness could not be attained. In such a case, more resin material will be required to make a preform, which will become undesirably heavy.

SUMMARY OF THE INVENTION

It is therefore an object of this invention to provide a method of manufacturing a heat-resistant vessel through process of making a preform, a primary blow-mold object and a secondary blow-mold object. The secondary blow-mold object has locally a large thickness portion on its body. The large thickness portion can be formed without adversely affecting the thickness of the other portion of the body.

Another object of this invention is to provide a primary blow-mold object to form a large thickness portion of part of the body of the secondary blow-mold object.

According to this invention, there is provided a method of manufacturing a heat-resistant vessel, comprising: injection-molding a preform; primary stretch blow molding the preform biaxially to obtain a primary blow-mold object, the primary blow-mold object being vertically longer than a heat-resistant vessel as a final product and having a concavity on part of a body thereof to form a large thickness portion on the heat-resistant vessel; shrinking the primary blow-mold object by applying heat; and secondary stretch blow molding the heat-shrunk object biaxially to obtain a secondary blow-mold object, the secondary blow-mold object having a large thickness portion on a body thereof according to the concavity on the primary blow-mold object to be used as the heat-resistant vessel.

The concavity can be formed on the body of the primary blow-mold object by making a convexity on a cavity wall of a primary blow cavity mold for the biaxial stretch blow molding process. A portion of the preform corresponding to the concavity of the primary blow-mold object is earlier contacted with the convexity of the blow cavity mold than the other portion of the preform, thereby making the concavity of the primary blow-mold object less stretched. Therefore the concavity has a large thickness. When the primary blow-mold object is subject to the secondary stretch blow molding process, the concavity of the primary blow-mold object is reflected in the large thickness portion of the secondary blow-mold object.

The large thickness portion of the primary blow-mold object has a large heat capacity, being slow to become hot during the heat-shrink process. This portion remains relatively low in temperature during the secondary stretch blow molding process, being less stretched. Therefore, the concavity having the large thickness on the primary blow-mold object can assure a large thickness portion of the secondary blow-mold object.

DETAILED DESCRIPTION

Figure 1:
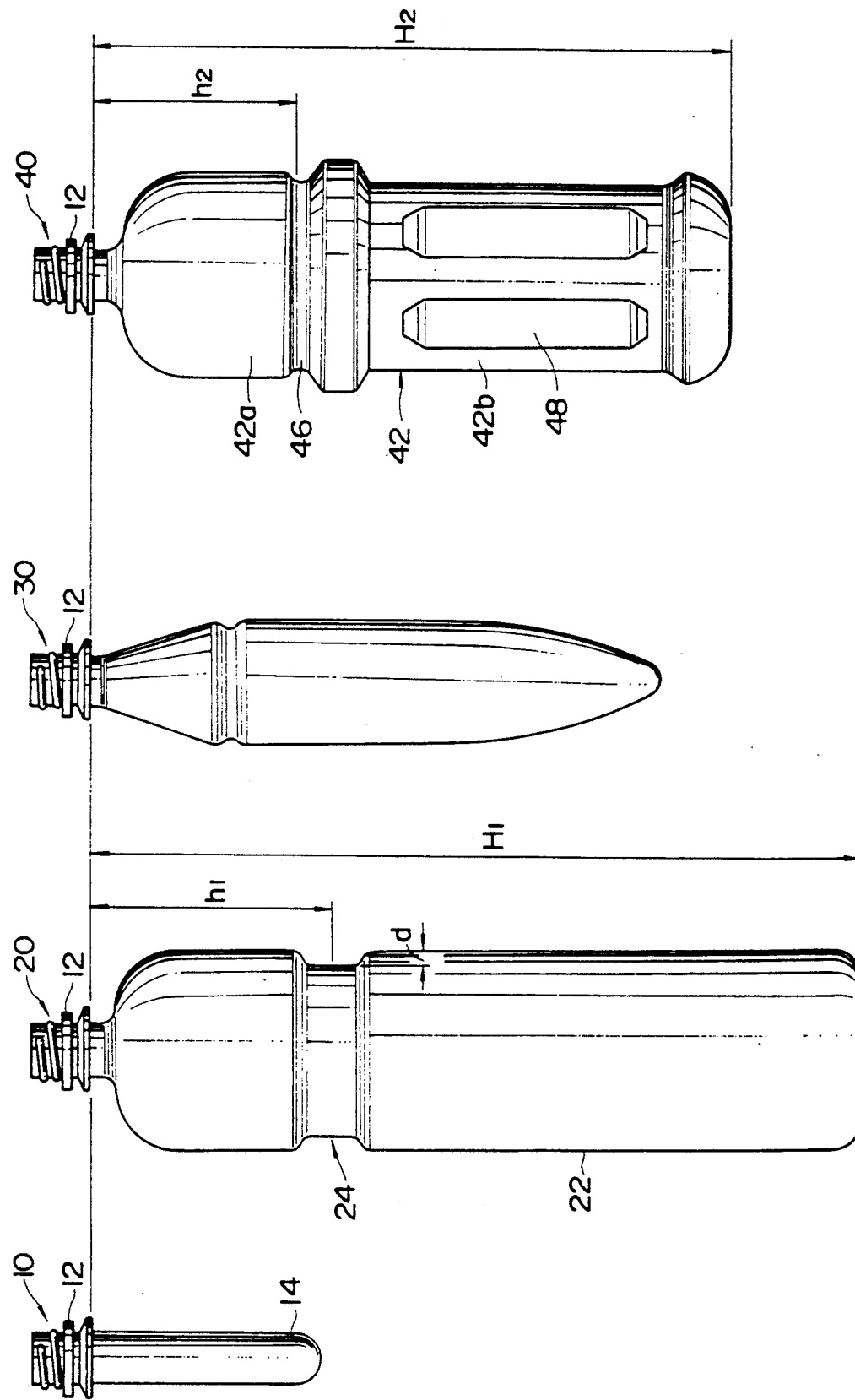
FIG. 1 is a front view of a preform, a primary blow-mold object, a heat-shrunk object, and a secondary blow-mold object according to an embodiment of this invention.

This invention will be described with reference to an embodiment shown in the drawing figures.

As shown in FIG. 1, a secondary blow-mold object 40 as a heat-resistant vessel, is made through steps of a preform 10, a primary blow-mold object 20, and a heat-shrunk object 30.

Figure 2:
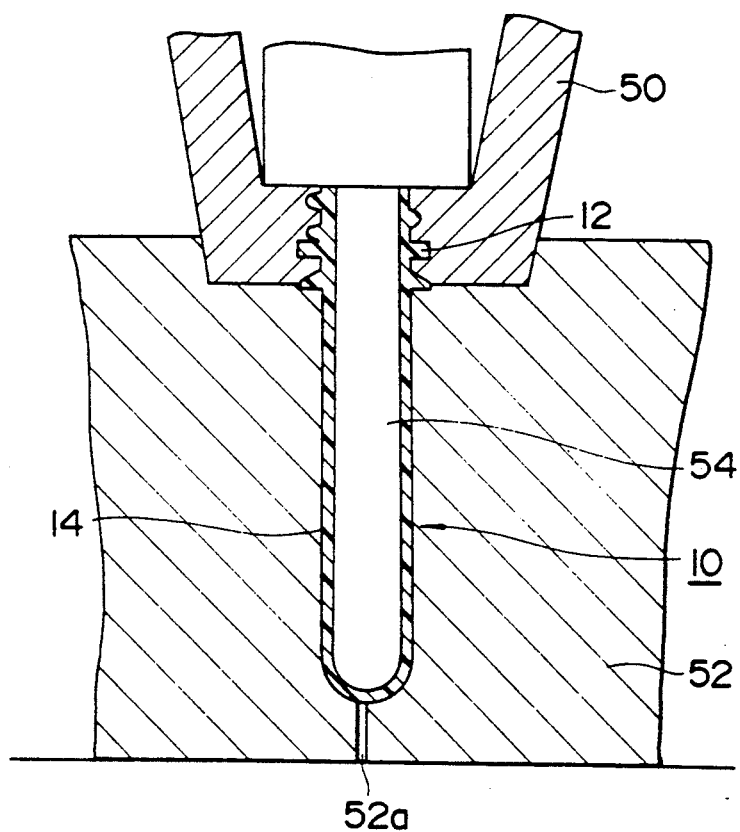
FIG. 2 is a cross-sectional view of an injection mold for making the preform.

The preform 10 is injection-molded by an injection mold shown in FIG. 2. The preform 10 is made of polyethylene terephthalate (hereinafter called "PET"), being a hollow cylindrical member having a neck 12 and a body 14 having a bottom. The injection mold includes a neck mold 50 for defining an outer wall of the neck 12 and having two mold halves to be horizontally openable, an injection cavity mold 52 for defining an outer wall of the body 14, and a core mold 54 for defining an inner wall of the preform 10. The PET resin is filled into the cavity mold 52 via a gate 52a at the bottom center of the cavity mold 52 to injection-mold the preform 10 in the injection cavity mold 52. The molded preform 10 is supported by the neck mold 50 to be carried to a subsequent processing stage.

The preform 10 is carried to a heating unit (not shown), where the preform 10 is heated up to a desired temperature. Then, the preform 10 is carried to a primary blow-molding unit shown in FIG. 3, obtaining a primary blow-mold object 20.

The primary blow-mold object 20 includes the neck 12 which has been injection-molded in the preceding process, and a bottomed body 22, which has been subject to the biaxial stretch blow molding process. Specifically, the primary blow-mold object 20 has a vertical length $H_1$, which is 20% longer than a longitudinally stretched length $H_2$ of a secondary blow-mold object 40. If necessary, the diameter of the primary blow-mold object 20 may be larger than the diameter of the secondary blow-mold object 40. In this embodiment, the primary blow-mold object 20 has a concavity 24 around part of the body 22. The concavity 24 is located at a distance $h_1$ from the lower end of the neck 12.

Figure 3:
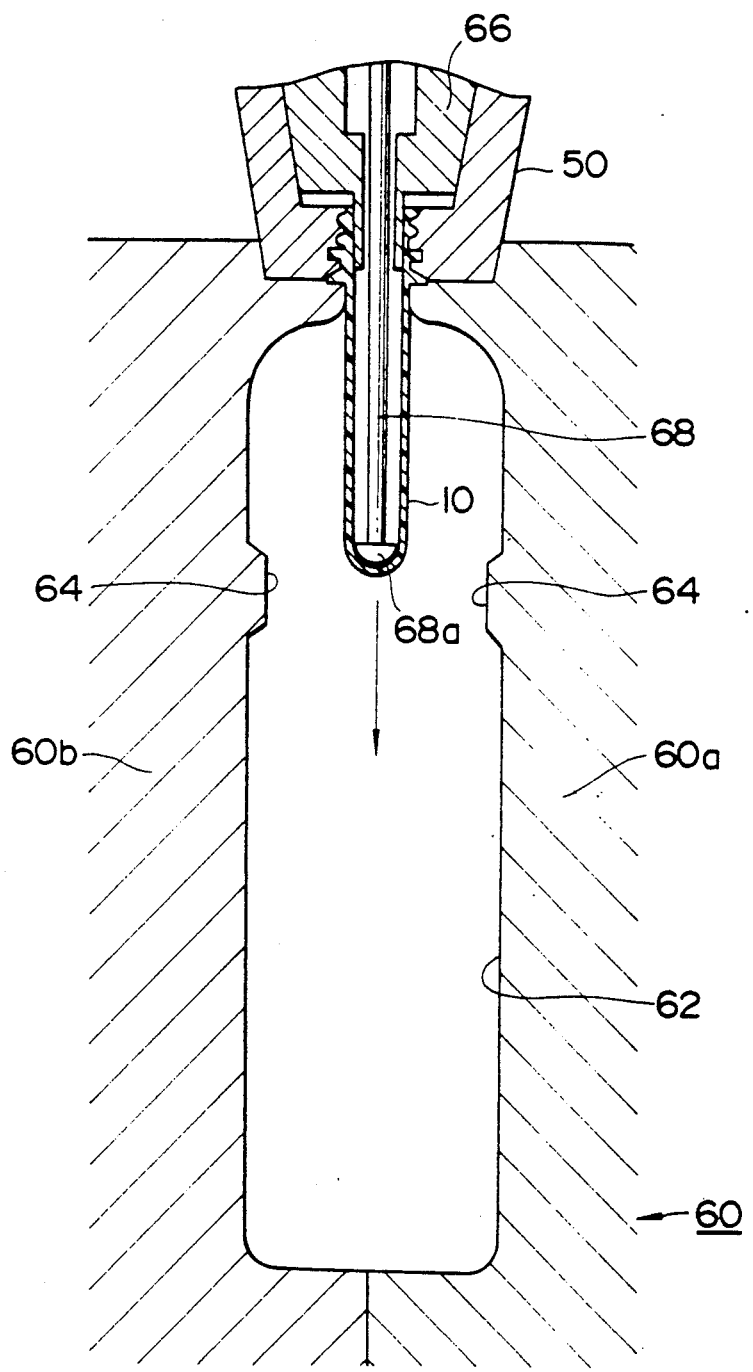
FIG. 3 is a cross-sectional view of a primary blow-mold.

As shown in FIG. 3, the mold for making the primary blow-mold object 20 comprises a primary blow cavity mold 60 including two mold halves 60a, 60b which are horizontally openable in the plane shown in FIG. 3, a blow core mold 66 to be inserted in the neck 12 of the preform 10, and a stretching rod 68 which is vertically movable along the blow core mold 66. The primary blow cavity mold 60 includes a cavity wall 62 corresponding to the shape of the primary blow-mold object 20, and a convexity 64 at a position corresponding to the concavity 24. The convexity 64 projects from the cavity wall 62.

The preform 10 is axially and vertically stretched by contacting the top 68a of the stretching rod 68 with the inner bottom wall of the preform and by downwardly moving the stretching rod 68. At the same time or after stretching the preform 10, a pressurized fluid such as air is introduced via the blow core mold 66 to stretch the preform 10 radially and laterally. Thus, the preform 10 is biaxially stretched and expanded to be in close contact with the cavity wall 62 and convexity 64 of the primary blow cavity mold 60 to obtain the primary blow-mold object 20.

Figure 4:
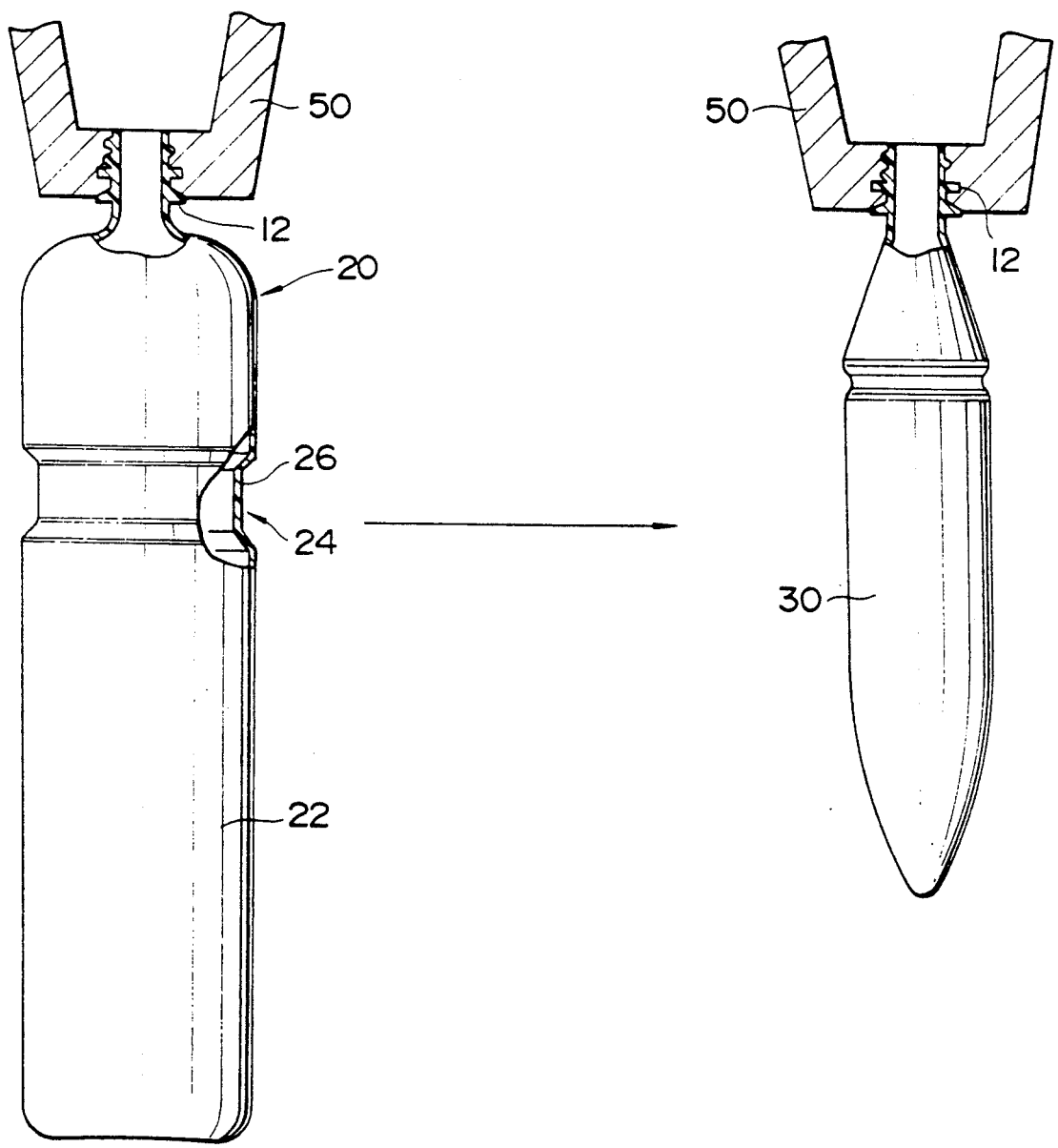
FIG. 4 shows how the primary blow-mold object is heat-shrunk.

The concavity 24 of the primary blow-mold object 20 is formed as follows: During the biaxial stretch blow molding process, the preform 10 firstly contacts with the convexity 64 of the cavity wall 62 of the primary cavity mold 60. This means that the area corresponding to the concavity 24 is less laterally stretched than the other area of the preform 10. The thickness of the concavity 24 is larger than the thickness of the body 22, thereby serving as a large thickness portion 26 as shown in FIG. 4. The depth d of the concavity 24 from the body 22 (FIG. 1) is 4.0 mm in this embodiment. The depth d is preferably 3.0 mm to 10.0 mm. When it is less than 3.0 mm deep, the large thickness portion 26 is not distinguishable from the thickness of the other portion of the body 22. Therefore, it is very difficult to satisfactorily form the large thickness portion on the secondary blow-mold object 40 to assure the mechanical strength. On the contrary, when the concavity 24 is deeper than the upper limit, the thickness around the concavity 24 change$so rapidly that it becomes difficult to perform the optimum biaxial stretch blow process in the secondary stretch blow molding process. Specifically, the distance between the body of the preform 10 and the convexity 64 of the cavity mold is too short to perform primary blow-molding, and the thickness of the other portion of the body would not be uniform.

The primary blow-mold object 20 supported by the neck mold 50 is then carried to the heat-shrink process, in which the primary blow-mold object 20 is placed in an ambience heated by an oven. The body 22 of the primary blow-mold object 20 is heated for a preset period of time at a temperature between 180° and 220° C. The primary blow-mold object 20 shown in FIG. 4 is biaxially shrunk by heat, thereby obtaining a heat-shrunk object 30 as shown in FIG. 4. During the heat-shrink process, a specified internal pressure (by blowing air, for example) is applied into the blow-mold object 20 to prevent it from being excessively shrunk, or a rod may be inserted to control the vertical shrinkage of the blow-mold object 20.

The heat-shrunk object 30 supported by the neck mold 50 then undergoes the secondary stretch blow molding process, obtaining a secondary blow-mold object 40. The secondary blow-mold object 40 includes a body 42 having a vertical length $H_2$ (e.g. $H_2 = 0.8 \times H_1$) under the neck mold 12. A reinforcing rib 46 in the shape of concave ring is formed at the upper side of the body 42 to increase a buckling strength. The reinforcing rib 46 is located at a distance $h_2$ from the end of the neck 12. A portion 42a of the body 42 has a smooth surface, to which a label or like will be attached to show a substance to be held in the vessel, thereby strengthening this portion. A portion 42b below the reinforcing rib 46 will be formed with reinforcing vertical concave ribs 48. The portion 42b is called a collapse panel which is widely employed in heat-resistant plastic vessels. When the vessel filled with the substance is heated and sterilized, the pressure inside the vessel sealed by a cap will become lower than the atmospheric pressure after the vessel returns a normal temperature, deforming the vessel due to the pressure difference. The vessel can endure such deformation by the collapse panel structure.

Figure 5:
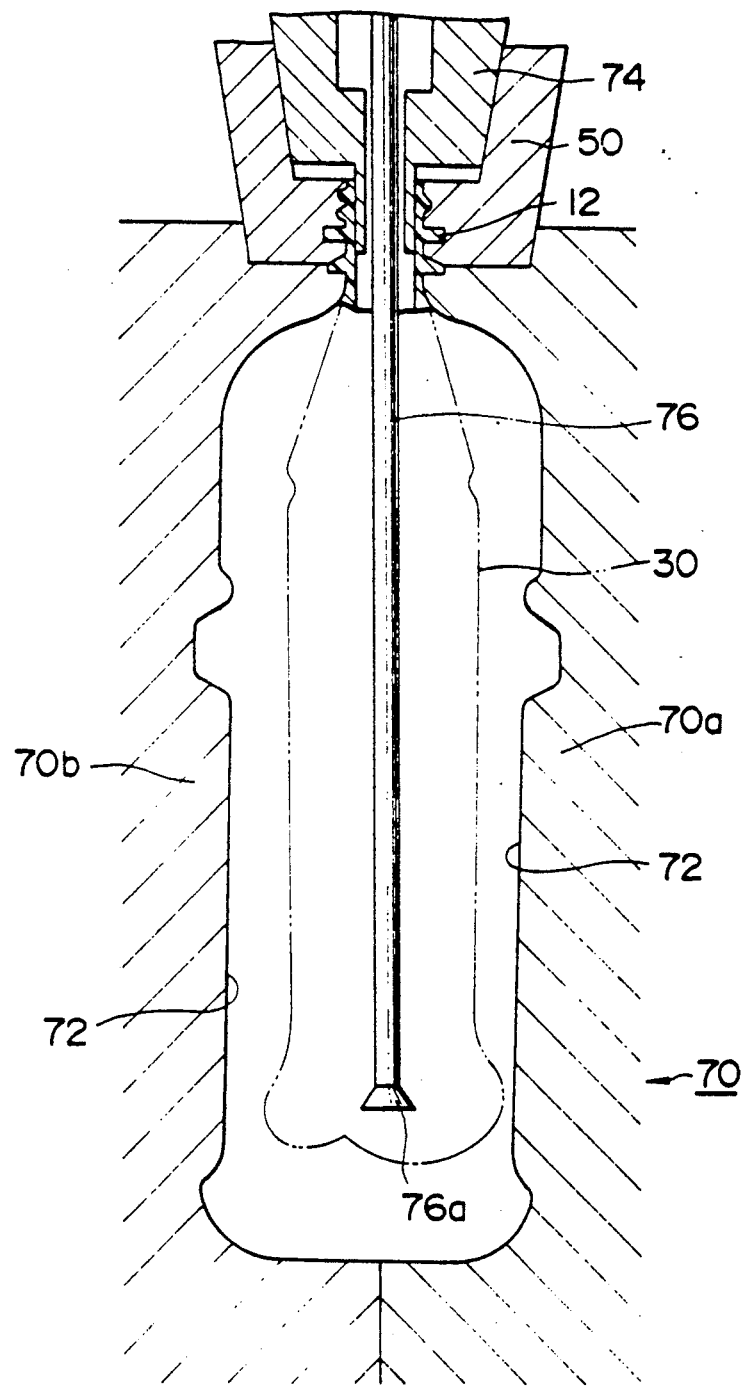
FIG. 5 is a cross-sectional view of a secondary blow-mold.

The mold for making the secondary blow-mold object 40 comprises a secondary blow-mold 70 including two mold halves 70a, 70b which can be opened horizontally in the plane shown by FIG. 5, a blow core mold 74 to be inserted into the neck 12, and a stretching rod 76 to be vertically movable along the blow core mold 74. The secondary blow-mold 70 has a cavity wall 72 according to the configuration of the secondary blow-mold object 40 as the final product. The secondary stretch blow molding process is similar to the foregoing primary stretch blow molding process. A top 76a of a stretching rod 76 is contacted to the bottom of the heat-shrunk object 60, which is then vertically stretched by a stretching rod 76 moved downwardly. Simultaneously with or after the vertical stretching, a pressured fluid such as air is introduced via the blow core mold 74 to stretch the heat-shrunk object 70 radially and laterally, obtaining the secondary blow-mold object having the body 42 defined by the cavity wall 72 of the secondary blow-mold 70.

According to this invention, the preform is subject to the primary stretch blow molding process, heat-shrink process and secondary stretch blow molding process to obtain the secondary blow-mold object as the final product. Compared with a method employing one blow molding process, the method of this invention includes the primary and second stretch blow molding process which are performed at relatively low temperatures. The molded object is heat-processed at relatively high temperatures prior to the primary and secondary stretch blow molding processes. The secondary blow-mold object experiencing the foregoing processes has a distinctive biaxial crystal orientation, which makes the final product mechanically strong enough to endure very strict conditions in later stages.

The reinforcing rib 46 at the distance $h_2$ from the end of the neck 12 of the secondary blow-mold object corresponds to the concavity 24 at the distance $h_1$ from the neck 12 of the primary blow-mold object 20. The concavity 24 of the primary blow-mold object 20 is formed as the large thickness portion 26, which remains large in thickness in the heat-shrunk object 30 compared with the other portion of the object 30. Therefore, the large thickness portion 26 corresponding to the concavity 24 can be kept the thickness thereof thicker than that of the other portion during the secondary stretch blow molding process, thereby maintaining the reinforcing rib 46 thicker than the other portion of the secondary blow-mold object 40.

The reinforcing rib 46 can be made thick as follows. During the heat-shrink process to obtain a heat-shrunk object 30, the whole of the object 30 is adjusted to an adequate temperature for stretch blow molding. Specifically, the large thickness portion has a large heat capacity, being slow to become hot compared with a small thickness portion. The large thickness portion of the heat-shrunk object 30 has a temperature relatively lower than the temperature of the other portion. During the stretch blow molding process, the thinner and hotter portion is easily stretched. The large thickness portion is less stretched. Therefore, the reinforcing rib 46 can remain thicker than the other portion of the secondary blow-mold object 40. The concavity 24 of the primary blow-mold object 20 is effective to heat the secondary blow-mold object 30 at different temperatures according to the portions thereof.

With the secondary blow-mold object 40, the reinforcing rib 46 at the distance $h_2$ from the neck 12 is made thick for the reasons described below.

It is assumed that the secondary blow-mold object 40 is used as a beverage bottle of a 1.5 liter capacity. The portion 42a of the bottle above the reinforcing rib 46 is used for attaching a label showing the substance held in the bottle. The portion 42b of the bottle is formed with vertical reinforcing ribs. Both the portions 42a, 42b serve to increase the buckling strength of the bottle. In other words, when the buckling stress is applied to the secondary blow-mold object 40, the stress may concentrate on the portion between the portions 42a and 42b. To absorb such stress, the reinforcing rib 46 is formed at the center of the object 40 so that the object 40 becomes strong enough to endure the buckling stress.

According to this invention, the concavity 24 is formed at a specified position of the body 22 of the primary blow-mold object 20 so that a large-thickness portion 26 can be formed at a desired local area of the body 22 of the primary blow-mold object 20. The large thickness portion 26 of the primary blow-mold object 20 assures that the large thickness portion can be formed at the desired position of the body 42 of the secondary blow-mold object 40 without adversely affecting the other portion of the object 40.

With the primary blow-mold object 20, the large thickness portion 26 is confirmed to be 0.28 mm thick, and the portions except for the portion 26 are about 0.25 mm thick. With the secondary blow-mold object 40, the reinforcing rib 46 is 0.46 mm thick, while the other portions are 0.37 mm to 0.42 mm thick.

This invention is not limited to the foregoing embodiment but is modified within the scope of its subject matter.

The concavity 24 of the body 22 of the primary blow-mold object 20 can be formed at any position according to the position to be strengthened in the secondary blow-mold object 40. The position of the concavity 24 can be determined depending upon the shape of the final product such as a bottle. The large thickness portion may be formed to increase not only the buckling strength in the axial direction but also a mechanical strength to endure an external force in the lateral direction (e.g. a lateral external force applied to a handle of a vessel when it is gripped). The blow-mold objects may be carried by other means along a heating path in the heat-shrink process as well as by the neck mold 50.

What is claimed is:

1. A method of manufacturing a heat-resistant vessel, comprising:
   (a) injection-molding a preform;
   (b) primary stretch blow molding said preform biaxially in a primary blow cavity mold including a cavity wall with a convexity to obtain a primary blow-mold object which is vertically longer than the heat-resistant vessel wherein during said primary stretch blow molding process, a portion of said preform contacts the cavity wall at the convexity before other portions of the preform contact the cavity wall at points around the convexity to form a thickened concavity in said primary blow-mold object;
   (c) shrinking said primary blow-mold object by applying heat; and
   (d) secondary stretch blow molding said heat-shrunk object biaxially to obtain a secondary blow-mold object having a body portion, said secondary blow-mold object having a large thickness portion on said body portion corresponding to said concavity on said primary blow-mold object, said secondary blow-mold object used as the heat-resistant vessel.

2. The method according to claim 1, wherein during said secondary stretch blow molding process, said concavity of said heat-shrunk object ha a lower heat retaining capacity than the other body portion of said heat-shrunk object.

3. The method according to claim 1, wherein during said primary stretch blow molding process, a distance defining a depth of said concavity is 3.0 mm to 10.0 mm.

4. The method according to claim 1, wherein during said secondary stretch blow molding process, a circular reinforcing rib is formed on the large thickness portion of said secondary blow-mold object.

5. The method according to claim 1, wherein during said secondary stretch blow molding process, a collapse panel is formed on part of said body of said secondary blow-mold object, said collapse panel being positioned below said large thickness portion of said body of said secondary blow-mold object.

6. The method according to claim 5, wherein during said secondary stretch blow molding process, a smooth portion is formed below a shoulder and above said large thickness portion of said body of said secondary blow-mold object, said smooth portion being used to attach a label or the like, and said circular large thickness portion being positioned between said smooth portion and said collapse panel of said secondary blow-mold object.

7. The method according to claim 6, wherein a reinforcing rib is formed on said circular large thickness portion between said smooth portion and said collapse panel.

* * * * *